United States Patent
Jiang et al.

(10) Patent No.: US 10,176,557 B2
(45) Date of Patent: Jan. 8, 2019

(54) APPARATUS, SYSTEM, AND METHOD FOR ENHANCING IMAGE VIDEO DATA

(71) Applicant: The Boeing Company, Chicago, IL (US)

(72) Inventors: Qin Jiang, Oak Park, CA (US); Yuri Owechko, Newbury Park, CA (US)

(73) Assignee: The Boeing Company, Chicago, IL (US)

( * ) Notice: Subject to any disclaimer, the term of this patent is extended or adjusted under 35 U.S.C. 154(b) by 95 days.

(21) Appl. No.: 15/258,917

(22) Filed: Sep. 7, 2016

(65) Prior Publication Data

US 2018/0068418 A1 Mar. 8, 2018

(51) Int. Cl.
*G06K 9/40* (2006.01)
*G06T 5/00* (2006.01)
*G06T 7/00* (2017.01)

(52) U.S. Cl.
CPC ............ *G06T 5/002* (2013.01); *G06T 7/0081* (2013.01); *G06T 7/0095* (2013.01)

(58) Field of Classification Search
CPC ...... G06T 5/002; G06T 7/0081; G06T 7/0095
See application file for complete search history.

(56) References Cited

U.S. PATENT DOCUMENTS

| 5,526,446 | A | 6/1996 | Adelson et al. |
| 5,892,850 | A | 4/1999 | Tsuruoka |
| 6,731,436 | B2 | 5/2004 | Ishii et al. |
| 6,801,672 | B1 | 10/2004 | Thomas |
| 7,039,521 | B2 | 5/2006 | Hortner et al. |
| 7,068,328 | B1 | 6/2006 | Mino |
| 7,151,858 | B2 | 12/2006 | Kyong |
| 7,233,233 | B2 | 6/2007 | Taniguchi et al. |
| 7,432,800 | B2 | 10/2008 | Harter, Jr. et al. |
| 7,583,186 | B2 | 9/2009 | Kuhls et al. |

(Continued)

OTHER PUBLICATIONS

Comaniciu et al., Mean Shift Analysis and Applications, Department of Electrical and Computer Engineering, Rutgers University, pp. 1-8, accessed from http://comaniciu.net/Papers/MsAnalysis.pdf on Nov. 7, 2016.

*Primary Examiner* — Gregory M Desire
(74) *Attorney, Agent, or Firm* — Kunzler, PC (57) ABSTRACT

Described herein is a method for enhancing image data that includes dividing an image into multiple regions. The method includes measuring variations in pixel intensity distribution of the image to determine high pixel intensity variations for identifying an intensity-changing region. The method includes calculating a histogram of intensity distribution of pixel intensity values for the intensity-changing region without calculating a histogram of intensity distribution of pixel intensity values for each region of the multiple regions. The method also includes determining a transformation function based on the intensity distribution for the intensity-changing region. The method includes applying the transformation function to modify an intensity for each pixel in the image to produce an enhanced image in real time. The method also includes detecting in the enhanced image a horizon for providing to an operator of a vehicle an indication of the horizon in the image on a display in the vehicle.

20 Claims, 8 Drawing Sheets

(56) References Cited

U.S. PATENT DOCUMENTS

| | | | |
|---|---|---|---|
| 7,970,178 B2* | 6/2011 | Song | G01N 21/538 356/342 |
| 8,023,760 B1 | 9/2011 | Buck et al. | |
| 8,149,245 B1 | 4/2012 | Buck et al. | |
| 8,175,331 B2 | 5/2012 | Nagaoka et al. | |
| 8,417,053 B2* | 4/2013 | Chen | G06T 5/003 382/167 |
| 8,547,249 B2 | 10/2013 | David et al. | |
| 9,177,363 B1* | 11/2015 | Huang | G06T 5/003 |
| 9,350,905 B2* | 5/2016 | Hirooka | G06T 5/008 |
| 9,547,890 B2* | 1/2017 | Komiya | G06T 5/002 |
| 2003/0099405 A1 | 4/2003 | Avinash et al. | |
| 2004/0008904 A1 | 1/2004 | Lin et al. | |
| 2005/0181399 A1 | 8/2005 | Okimoto et al. | |
| 2005/0197567 A1 | 9/2005 | Qian et al. | |
| 2005/0265584 A1* | 12/2005 | Dobson | G06K 9/00711 382/104 |
| 2008/0298642 A1 | 12/2008 | Meenen | |
| 2009/0226087 A1 | 9/2009 | Aragaki et al. | |
| 2010/0226590 A1 | 9/2010 | Yoo et al. | |
| 2012/0257164 A1 | 10/2012 | Zee et al. | |
| 2014/0193032 A1* | 7/2014 | Zhang | G06T 5/003 382/103 |
| 2016/0267632 A1 | 9/2016 | Jiang et al. | |
| 2018/0068418 A1* | 3/2018 | Jiang | G06T 5/002 |

\* cited by examiner

APPARATUS, SYSTEM, AND METHOD FOR ENHANCING IMAGE VIDEO DATA

FIELD

This disclosure relates generally to image sensing, and more particularly to enhancing sensed image sequence data.

BACKGROUND

Some image sensors are used to obtain image sequence data by perceiving objects in day and/or night settings. The clarity of the image sequence data may be affected by environmental factors such as fog, haze, sand-brownouts, smoke, rain, snow, steam, and so forth. Unclear image sequence data may be difficult to use.

SUMMARY

The subject matter of the present application has been developed in response to the present state of the art, and in particular, in response to shortcomings of conventional image processing techniques. For example, conventional image processing techniques do not provide sufficient image clarity under certain conditions, such as in degraded visibility environments where visibility is degraded due to fog, haze, sand-brownouts, smoke, rain, snow, steam, and so forth.

Accordingly, the subject matter of the present application has been developed to provide an image enhancing apparatus, system, and method that overcome at least some of the above-discussed shortcomings of prior art techniques. More particularly, in some embodiments, described herein are apparatuses, systems, and methods for enhancing image sequence data by updating one or more transformation functions for only a certain portion of each image of the image sequence data.

According to one embodiment, a method of enhancing image sequence data includes dividing an image into multiple local area regions. The method also includes measuring a local area variation in pixel intensity distribution of the image to determine high pixel intensity variations for identifying an intensity-changing region of the multiple local area regions. The method includes calculating a histogram of intensity distribution of local area pixel intensity values for the intensity-changing region without calculating a histogram of intensity distribution of local area pixel intensity values for each local area region of the multiple local area regions. The method also includes determining a transformation function based on the intensity distribution for the intensity-changing region. The method includes applying the transformation function to modify an intensity for each pixel in the image to produce an enhanced image in real time. The method also includes detecting in the enhanced image a horizon for providing to an operator of a vehicle an indication of the horizon in the image on a display in the vehicle.

In one implementation of the method, the method includes: calculating a histogram of local intensity distribution for the image; determining an initial transformation function for each pixel in the image based on the local intensity distribution; and creating a lookup table that contains the initial transformation function for each pixel in the image. The lookup table is used to modify the intensity for each pixel in the image.

In yet one implementation of the method, determining the transformation function based on the intensity distribution for the intensity-changing region further includes determining multiple transformation functions, each transformation function of the multiple transformation functions corresponds to a respective intensity-changing region of multiple intensity-changing regions. The method includes updating the lookup table with the multiple transformation functions computed from the multiple intensity-changing regions. In such an implementation, applying the transformation function to modify the intensity for each pixel in the image further includes applying the updated lookup table to modify the intensity for each pixel in the image to produce the enhanced image in real time.

According to one implementation of the method, the method includes applying a smoothing filter to remove artifacts in the enhanced image.

In one implementation of the method, the method includes acquiring in real time, from infrared imaging equipment on the vehicle, multiple images in a video of an environment outside the vehicle.

In yet another implementation of the method, the method includes, for each image of multiple images in a video stream: calculating an updated histogram of intensity distribution of local area pixel intensity values for the intensity-changing region without calculating a histogram of intensity distribution of local area pixel intensity values for each local area region of the multiple local area regions; determining an updated transformation function based on the intensity distribution for the intensity-changing region; and modifying the intensity for each pixel in the image based on an updated lookup table formed based on the updated transformation function.

According to one implementation of the method, the intensity-changing region includes more than one local area region of the multiple local area regions.

In another embodiment, a mobile vehicle includes a sensor configured to detect an image and to produce image data associated with the image. The mobile vehicle also includes a processor operatively coupled to the sensor and configured to receive the image data. The mobile vehicle includes a memory that stores code executable by the processor. The code is executable by the processor to: divide the image into multiple regions; measure a variation in pixel intensity in the image to identify a region of the multiple local area regions with changing intensity; calculate a histogram of intensity distribution of pixel intensity values for the region without calculating a histogram of intensity distribution of pixel intensity values for each local area region of the multiple local area regions; determine a transformation function based on the intensity distribution for the region; apply the transformation function to modify an intensity for each pixel in the image to produce an enhanced image in real time; and detect in the enhanced image a horizon for providing to an operator of a vehicle an indication of the horizon in the image on a display in the vehicle.

According to one implementation, the sensor includes an infrared image sensor.

In one implementation, the mobile vehicle includes a display device operatively coupled to the processor and configured to display the enhanced image.

In another implementation, the memory stores a lookup table that contains initial transformation functions for each pixel in the image.

In yet another implementation, the code is executable by the processor to: calculate a histogram of local intensity distribution for the image; determine the initial transformation function for each pixel in the image based on the local intensity distribution; and create the lookup table that contains the initial transformation function for each pixel in the image. The lookup table is used to modify the intensity for each pixel in the image.

In certain implementations, the code is executable by the processor to apply a smoothing filter to remove artifacts in the enhanced image.

In some implementations, the sensor is configured to detect multiple images in a video of an environment outside the mobile vehicle.

In various implementations, the region includes more than one region of the multiple regions.

In yet another embodiment, an apparatus includes an initialization module that divides an image into multiple local area regions, calculates a histogram of local intensity distribution for an image, determines an initial transformation function for each pixel in the image based on the local intensity distribution, and creates a lookup table that contains the initial transformation function for each pixel in the image. The lookup table is used to modify the intensity for each pixel in the image. The apparatus also includes a region identification module that measures a local area variation in pixel intensity distribution of the image to determine high pixel intensity variations for identifying an intensity-changing region of the multiple local area regions, calculates a histogram of intensity distribution of local area pixel intensity values for the intensity-changing region without calculating a histogram of intensity distribution of local area pixel intensity values for each local area region of the multiple local area regions, and determines a transformation function based on the intensity distribution for the intensity-changing region. The apparatus includes a transformation function update module that applies the transformation function to modify an intensity for each pixel in the image to produce an enhanced image in real time. At least one of the initialization module, the region identification module, and the transformation function update module includes one or more of hardware and executable code. The executable code is stored on one or more non-transitory computer readable storage media.

According to one implementation, the apparatus includes a filter module that filters the enhanced image to remove artifacts.

In one implementation, the apparatus includes an update module that updates the lookup table with the transformation function.

In various implementations, the transformation function update module applies the updated lookup table to modify the intensity for each pixel in the image to produce the enhanced image in real time.

In some implementations, the apparatus includes an image acquisition module that acquires multiple images in a video of an environment outside a vehicle.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
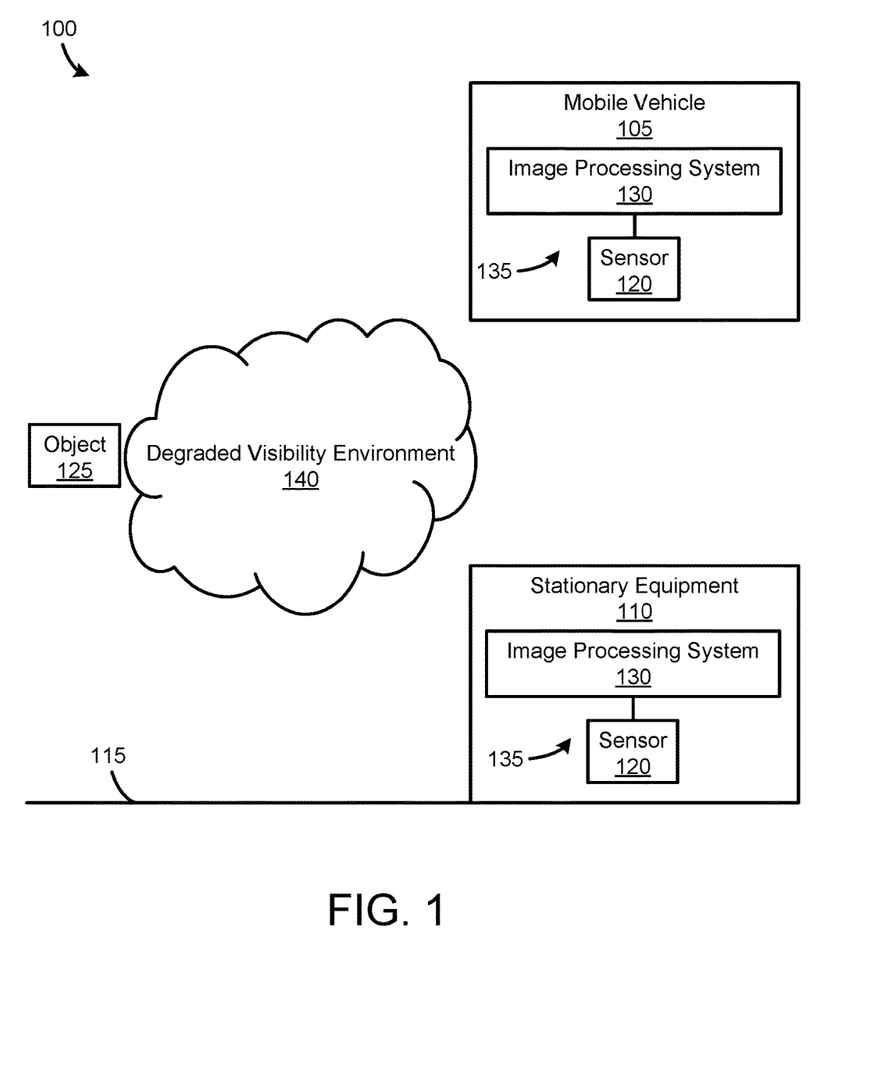
FIG. 1 is a schematic diagram of an environment in which image data may be received and/or processed according to one embodiment.

Referring to FIG. 1, and according to one embodiment, an environment 100 in which image data may be received and/or processed is illustrated. As used herein, image data may refer to one or more images, image video data, video data, a sequence of images, and/or image sequence data. In the illustrated environment 100, a mobile vehicle 105 and/or a stationary equipment 110 may be used to receive and/or process image data. In certain embodiments, the mobile vehicle 105 may be an aircraft such as an airplane, a helicopter, a jet, a drone, and so forth flyable above a ground surface 115. In other embodiments, the mobile vehicle 105 may be a rocket, a satellite, a missile, and so forth. Moreover, in some embodiments, the stationary equipment 110 may be part of a ground surveillance system positioned on the ground surface 115.

Both the mobile vehicle 105 and the stationary equipment 110 may include a sensor 120 used to detect or capture optical images of objects, such as an object 125, and to convert the optical images of objects into image data associated with the images. As may be appreciated, the sensor 120 may be any suitable image sensor, such as an infrared (IR) sensor, a semiconductor charge-coupled device (CCD), an active pixel sensor, and so forth. The image data associated with the images may be produced and/or provided to another device. For example, in the illustrated embodiment, the sensor 120 may provide the image data to an image processing system 130 to process the image data and/or to enhance the quality of the image data. As illustrated, an imaging system 135 includes the sensor 120 and the image processing system 130.

As illustrated, a degraded visibility environment 140 may block the sensor 120 from sensing a clear image of the object 125, thus resulting in degraded image data. The degraded visibility environment 140 may be any type of environment that reduces the quality of the sensed image obtained from the sensor 120. For example, the degraded visibility environment 140 may include fog, haze, sand-brownout, smoke, rain, snow, steam, and so forth. The image processing system 130 may be used to enhance the quality of the image data obtained while the degraded visibility environment 140 is present. The object 125 may be located within or adjacent to the degraded visibility environment 140. Similarly, the mobile vehicle 105 and stationary equipment 110 also may be located within or adjacent to the degraded visibility environment 140.

The image processing system 130 may be used to enhance image sequence data by dividing an image into multiple local area regions. To process the first image of the image sequence data, the image processing system 130 may calculate a histogram of intensity distribution for every local area region, construct a transformation function using the histogram, and modify the intensity value of every pixel in each local area region with its transformation function for producing an enhanced the first image. The transformation functions of all image pixels are stored in a lookup table of transformation function. After the first image, to process an image, the image processing system 130 may measure a local area variation in pixel intensity distribution of the image to determine high pixel intensity variations for identifying an intensity-changing region of the multiple local area regions. The image processing system 130 may calculate a histogram of intensity distribution of local area pixel intensity values for the intensity-changing region without calculating a histogram of intensity distribution of local area pixel intensity values for each local area region of the multiple local area regions. The image processing system 130 may determine a transformation function based on the intensity distribution for the intensity-changing region and update the lookup table of transformation functions with the newly calculated transformation function for the intensity-changing region. The image processing system 130 may apply the transformation function table for modification of intensity values for each pixel in the image to produce an enhanced image in real time. The image processing system 130 may also detect in the enhanced image sequence a horizon for providing to an operator of a vehicle an indication of the horizon in the image on a display in the vehicle. Accordingly, the image processing system 130 may produce enhanced image sequence data from the degraded image sequence data obtained by the sensor 120.

Figure 2:
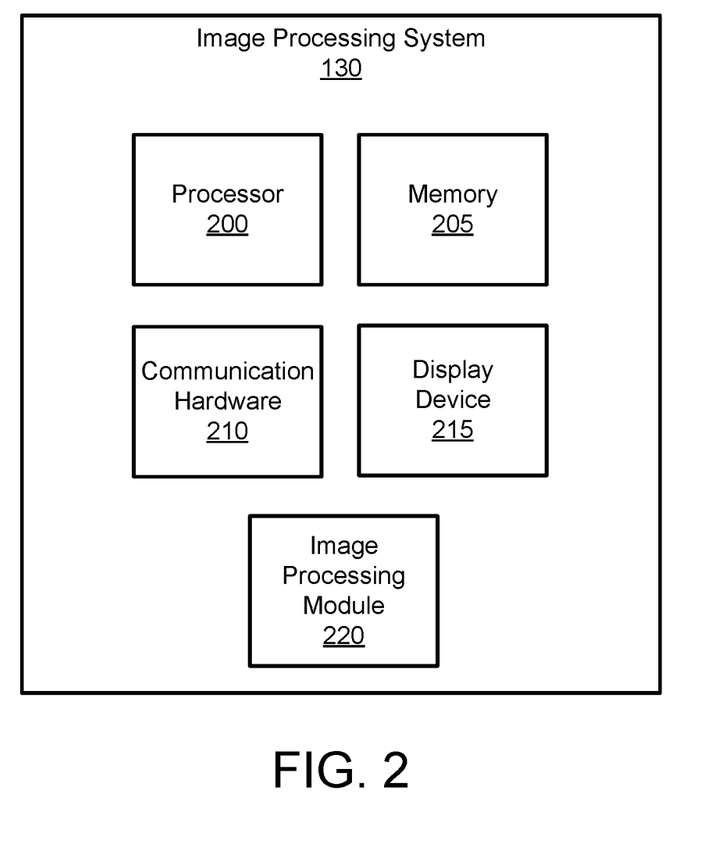
FIG. 2 is a schematic block diagram of an image processing system according to one embodiment.

FIG. 2 is a schematic block diagram of an embodiment of the image processing system 130. The image processing system 130 includes a processor 200, memory 205, communication hardware 210, a display device 215, and an image processing module 220. The memory 205 may be a semiconductor storage device, a hard disk drive, an optical storage device, a micromechanical storage device, or combinations thereof. Furthermore, the memory 205 may store code and the processor 200 may be used to execute the code. In certain embodiments, the processor 200 may be operatively coupled to the sensor 120 and configured to receive image data from the sensor 120. Moreover, the communication hardware 210 may communicate with other devices. The display device 215 may be operatively coupled to the processor 200 and used to display data, such as image data and/or enhanced image data. In one embodiment, the image processing system is disposed on a mobile vehicle, and the display device that is operatively coupled to the processor is a display device on the vehicle for an operator of the vehicle. The image processing module 220 may include various modules used to enhance image data received from the sensor 120.

In certain embodiments, the memory 205 may store code executable by the processor to: divide an image into multiple regions; calculate histograms and transformation functions for the first image; modify intensity values of every pixel with the transformation functions for producing enhanced first image; create a lookup table to store all of the transformation functions; measure a variation in pixel intensity in the image to identify a region of the multiple local area regions with changing intensity; calculate a histogram of intensity distribution of pixel intensity values for the region without calculating a histogram of intensity distribution of pixel intensity values for each local area region of the multiple local area regions; determine a transformation function based on the intensity distribution for the region; update the lookup table of transformation functions for the intensity changing region; apply the lookup table of transformation functions to modify intensity values for each pixel in the image to produce an enhanced image in real time; and detect in the enhanced image a horizon for providing to an operator of a vehicle an indication of the horizon in the image on a display in the vehicle. The code executable by the processor may also generate an overlay of a horizon indicia on the display device that is operatively coupled to the processor, such as an overlay of a line at the location of the horizon detected in the enhanced image sequence. Accordingly, the system may generate an overlay of a visual indicia of the horizon onto the enhanced image of a degraded visibility environment 140 that is presented on a display device in the vehicle, to provide an easily identified indication of the horizon to the operator of the vehicle.

Figure 3:
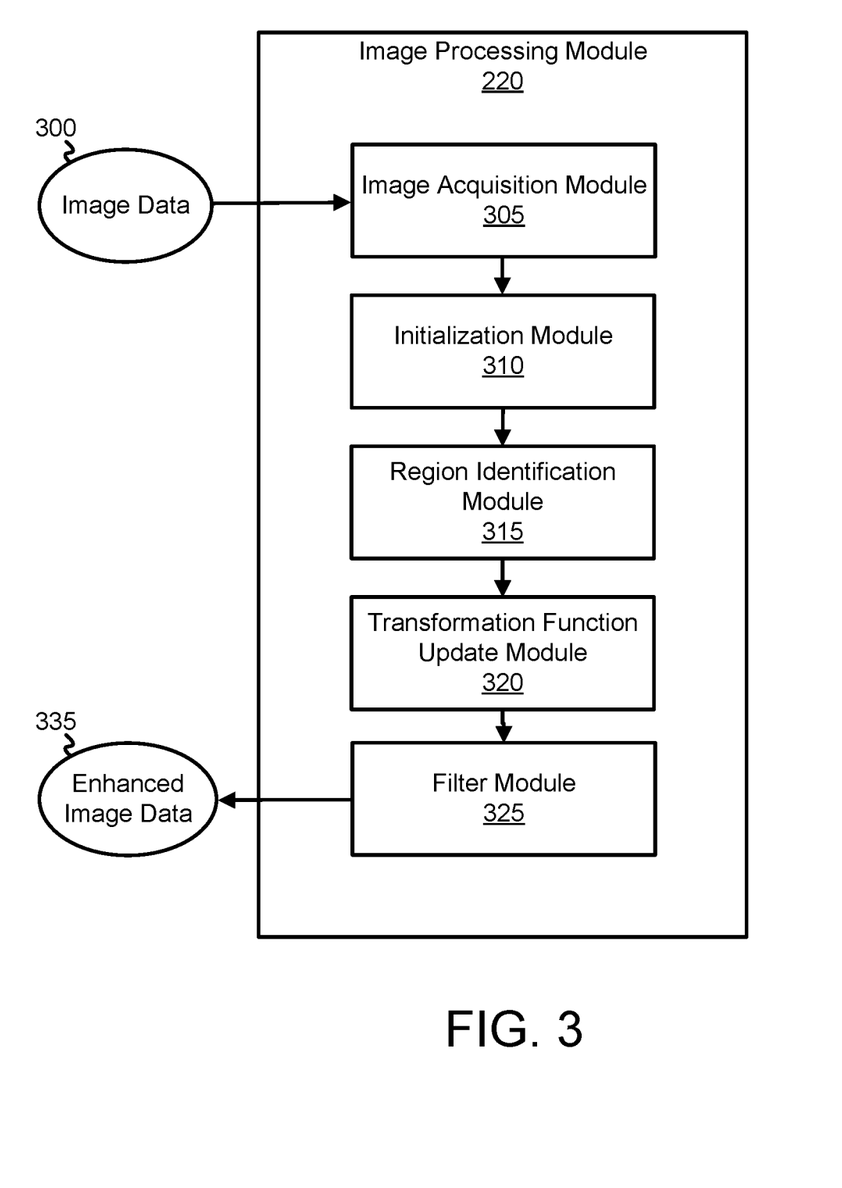
FIG. 3 is a schematic block diagram of an image processing module according to one embodiment.

FIG. 3 is a schematic block diagram of one embodiment of the image processing module 220. The image processing module 220 receives image sequence data 300, such as image sequence data from a degraded environment. An image acquisition module 305 obtains the image sequence data 300, such as by using the sensor 120. The image acquisition module 305 may acquire multiple images that may be part of a video in an environment outside of a vehicle (e.g., mobile vehicle 105, stationary equipment 110). An initialization module 310 receives the image sequence data 300 from the image acquisition module 305, and processes the first image of the image sequence data. The initialization module 310 divides an image into multiple local area regions, calculates a histogram of local intensity distribution for an image, determines an initial transformation function for each pixel in the image based on the local intensity distribution, and creates a lookup table that contains the initial transformation function for each pixel in the image. The lookup table is used to modify the intensity for each pixel in the image for producing a first enhanced image.

After the first image of the image sequence data, to process another image of the image sequence data, a region identification module 315 measures a local area variation in pixel intensity distribution of the image to determine high pixel intensity variations for identifying an intensity-changing region of the multiple local area regions, calculates a histogram of intensity distribution of local area pixel intensity values for the intensity-changing region without calculating a histogram of intensity distribution of local area pixel intensity values for each local area region of the multiple local area regions, and determines a transformation function based on the intensity distribution for the intensity-changing region. Moreover, a transformation function update module 320 updates the lookup of transformation functions with the newly computed transformation function of the intensity-changing region and applies the lookup table of transformation function to modify an intensity for each pixel in the image to produce an enhanced image in real time. A filter module 325 filters the enhanced image to remove the artifacts produced by the intensity transformation based on local area intensity distributions. Enhanced image data 335 is output from the image processing module 220.

The filter module 325 may enhance the image by remove blocking artifacts on the boundaries of the local area regions using a smoothing filter to reduce boundary differences. In certain embodiments, a one dimensional smoothing filter may be used to reduce boundary effects. In one embodiment, a horizontal filter may be used to remove vertical boundaries while, in another embodiment, a vertical filter may be used to remove horizontal boundaries.

For example, in an embodiment in which $(x_0, y_0)$ is a horizontal boundary point, a filtered pixel value may be calculated using Equation 1.

$$\hat{I}(x_0, y_0) = \frac{1}{N+1} \sum_{k=-N/2}^{N/2} I(x_0 + k, y_0) \qquad \text{Equation 1}$$

In such an embodiment, the variable N+1 may be a length of a one dimensional filter.

As another example, in another embodiment in which $(x_0, y_0)$ is a vertical boundary point, a filtered pixel value may be calculated using Equation 2.

$$\hat{I}(x_0, y_0) = \frac{1}{N+1} \sum_{k=-N/2}^{N/2} I(x_0, y_0 + k) \qquad \text{Equation 2}$$

As may be appreciated, the boundary points may be known and/or may be generated by a region partition process. The smoothing filtering may be applied only to the boundary points to remove blocking effects.

Figure 4:
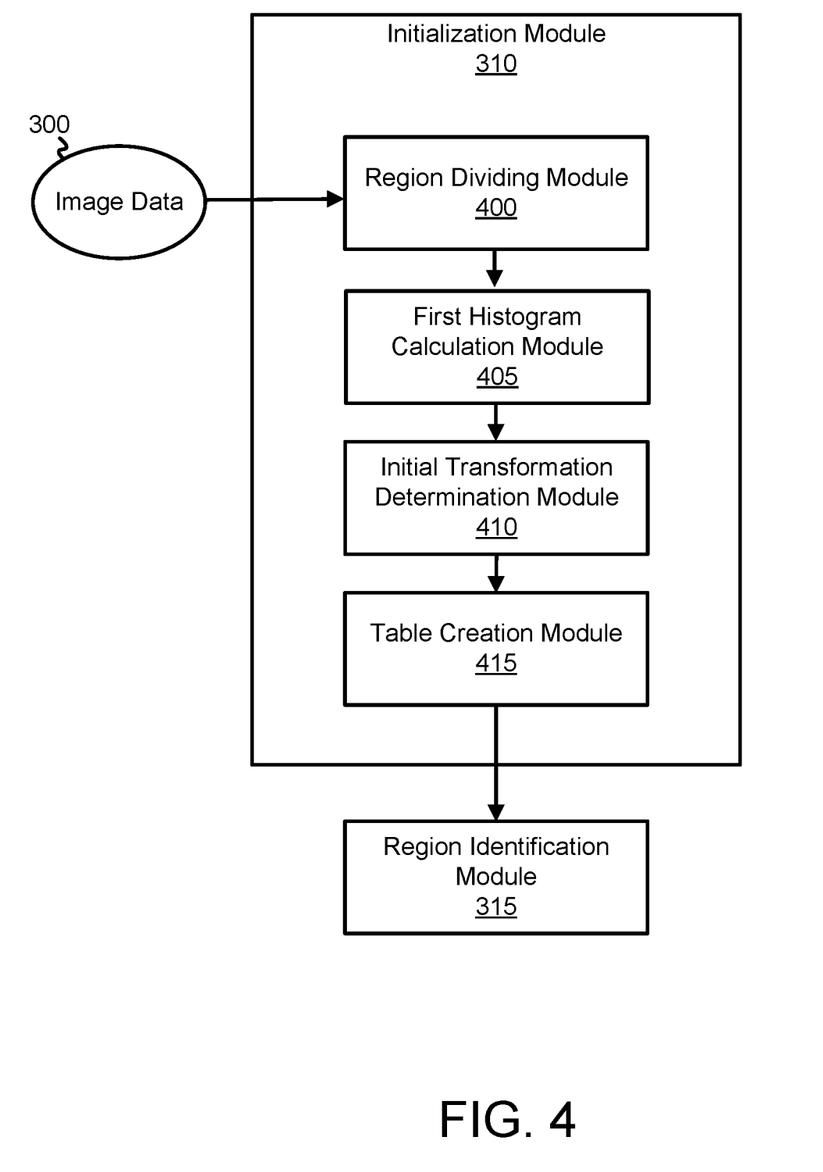
FIG. 4 is a schematic block diagram of an initialization module according to one embodiment.

FIG. 4 is a schematic block diagram of one embodiment of the initialization module 310. The initialization module 310 includes a region dividing module 400 that divides an image into multiple local area regions, a first histogram calculation module 405 that calculates a histogram of local intensity distribution for the first image of the image sequence data from module 400, an initial transformation determination module 410 that determines an initial transformation function for each pixel in the image based on the local intensity distribution, and a table creation module 415 that creates a lookup table that contains the initial transformation function for each pixel in the image.

The region dividing module 400, in one embodiment, for an input image sequence I(x, y, t), may partition each input image frame into K rectangular regions in which R={$r_k$: k=1, 2, 3 . . . , K} using Equations 3 and 4.

$$I(x, y, t) = \sum_{k=1}^{K} P_k(x, y, t) \qquad \text{Equation 3}$$

$$P_k(t) = \{I(x, y, t); (x, y) \in r_k\} \qquad \text{Equation 4}$$

Every image frame in the image sequence may have the same region partitioning.

The first histogram calculation module 405 may calculate a histogram of local intensity distribution for the first image using any suitable technique. In one embodiment, for processing the first image frame I(x, y, t), local statistics (e.g., an intensity distribution) may be estimated using a partition region $P_k(t)$ using Equation 5.

$$\text{hist}_k(t_1) = \text{histogram}(p_k(t_1)) \qquad \text{Equation 5}$$

In certain embodiments, to inhibit an over-stretching transformation in intensity modification for homogeneous regions, a local histogram may have a predefined threshold value $\eta_h$ as found in Equation 6 to produce a modified local histogram.

$$\text{hist}_k^{md}(b, t_1) = \{\eta_h, \text{ if } (\text{hist}_k(b) < \eta_h); \text{ otherwise}(\text{hist}_k(b, t_1))\} \qquad \text{Equation 6}$$

The modified local histogram may be used to compute a local probability density function for a region. The local probability density function may be computed using Equation 7.

$$pdf_k(b) = \frac{\text{hist}_k^{md}(b)}{\sum_{i=1}^{B} \text{hist}_k^{md}(i)} \qquad \text{Equation 7}$$

The initial transformation determination module 410 may determine an initial transformation function for each pixel based on a probability density function for a region. The transformation function for a region $r_k$ may be determined using Equation 8.

$$f_k^r(v) = \sum_{i=1}^{v} pdf_k(i) \qquad \text{Equation 8}$$

Moreover, partition regions may have a set of region centers given by Equation 9.

$$C = \{c_k(x, y); k=1, 2, 3, \ldots, K\} \qquad \text{Equation 9}$$

The transform function for each pixel p(x, y) in I(x, y, $t_1$) may be constructed by linear interpolation of four region transform functions that have a nearest center to the pixel. The transform function for each pixel p(x, y) may be computed using Equations 10, 11, and 12.

$$f_p(v) = \sum_{i=1}^{4} w_i f_i^T(v) \quad \text{Equation 10}$$

$$w_i = \frac{q_i}{\sum_{j=1}^{4} q_j}; \quad q_i = \frac{1}{d_i} \quad \text{Equation 11}$$

$$d_i = \|p(x, y) - c_i(m, n)\| \quad \text{Equation 12}$$

In Equation 12 $c_i(m, n)$ may represent a center of a region $r_i$. Moreover, Equation 12 may be used to determine a distance between a pixel and the center of the region. Because the distance between the pixel and the region center is fixed from frame to frame, the weight factor computed by Equation 11 may be pre-calculated and stored in an interpolation lookup table indexed by pixel locations. An interpolation lookup table may speed up the computing process of constructing a pixel transform function in real-time computing.

The table creation module 415 may create a lookup table of transform functions indexed by pixel $p(x, y)$ using Equation 13.

$$\text{Trans\_Tab} = \{p(x,y): f_p(v); p(x,y) \in I(x,y,t_1)\} \quad \text{Equation 13}$$

Figure 5:
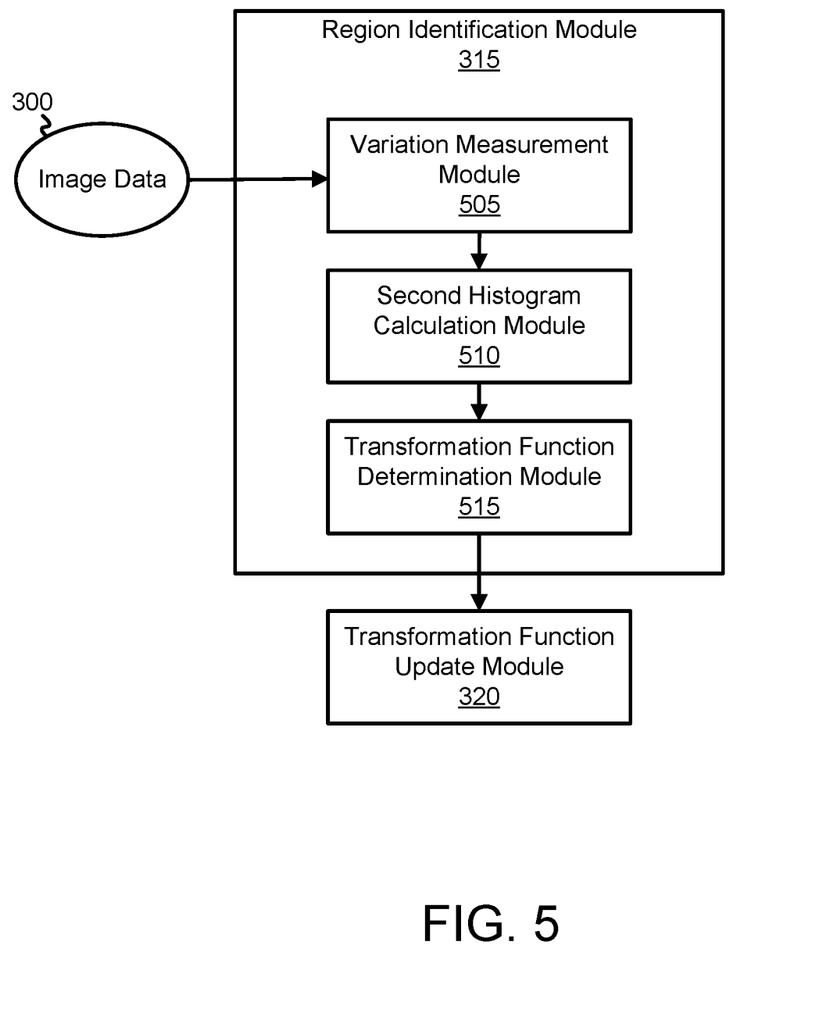
FIG. 5 is a schematic block diagram of a region identification module according to one embodiment.

FIG. 5 is a schematic block diagram of one embodiment of the region identification module 315. The region identification module 315 includes a variation measurement module 505 that measures a local area variation in pixel intensity distribution of the image to determine high pixel intensity variations for identifying an intensity-changing region of the multiple local area regions, a second histogram calculation module 510 that calculates a histogram of intensity distribution of local area pixel intensity values for the intensity-changing region, and a transformation function determination module 515 that determines a transformation function based on the intensity distribution for the intensity-changing region.

Specifically, in certain embodiments, the region identification module 315 may, starting with the second image frame, and using the frame partitioned into regions, detects a dynamically changed region using the variation measurement module 505 and/or the second histogram calculation module 510. The region identification module 315 may compute intensity changes for each region and outputs a subset of regions that have large intensity changes with respect to time. The transformation function determination module 515 may compute pixel transform functions of the intensity-changing region using Equations 5 through 12. The newly computed pixel transform functions may be used to update the look-up table of transform functions. The updated look-up table may be used to modify intensity values of the image frame. If the intensity value of pixel $p(x, y)$ is a, the modified intensity value is given by Equation 14.

$$a_{new} = f_{p(x,y)}(a) \quad \text{Equation 14}$$

After modifying the intensity values of all pixels in $I(x, y, t)$, a smoothing filter (e.g., filter module 325) may be applied to the image frame to remove blocking effects generated by local area based processing.

Figure 6:
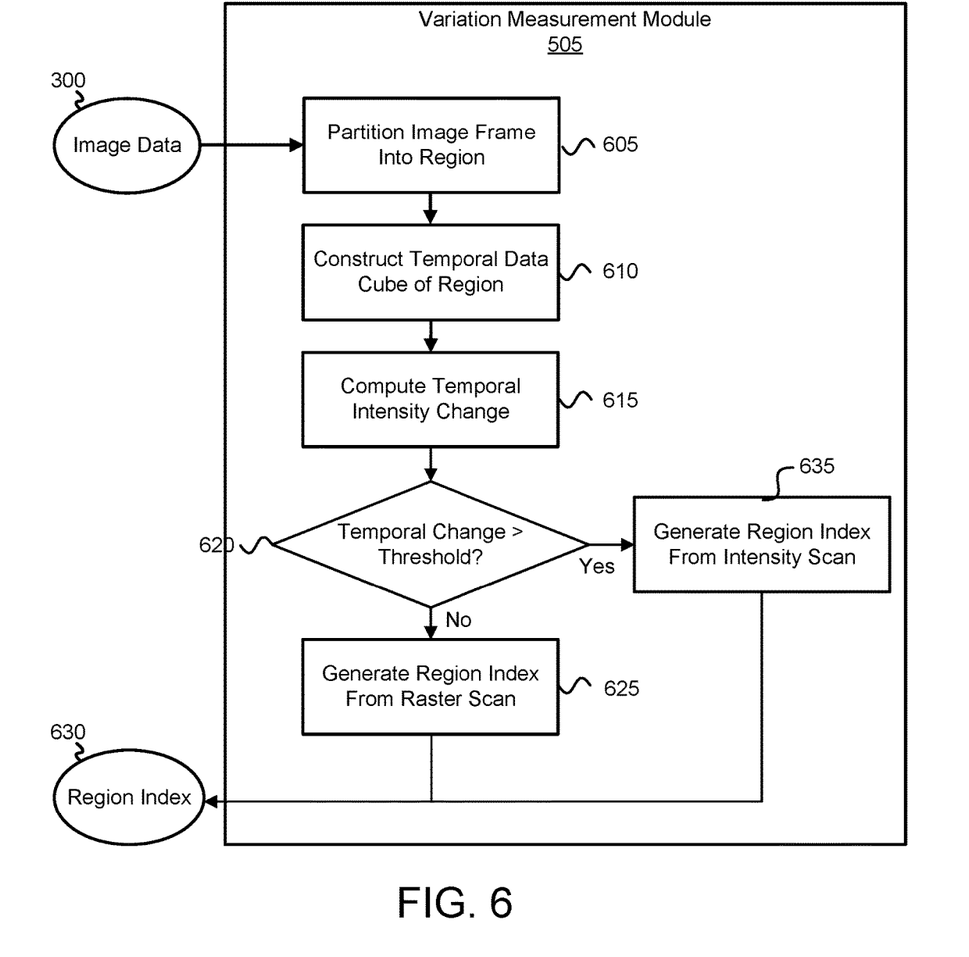
FIG. 6 is a schematic block diagram of a variation measurement module according to one embodiment.

FIG. 6 is a schematic block diagram of one embodiment of the variation measurement module 505. As may be appreciated, a density of atmospheric particles may influence degradation in the visibility of IR images. Image intensity changes in IR images in a temporal domain may be closely related to the density change of atmospheric particles because a high density of atmospheric particles may reduce or block the radiance emitted from objects. Therefore, the intensity change of IR image sequences may represent the density change of atmospheric particles, which may be useful information for enhancing degraded IR images. For visibility enhancement techniques based on local image statistics, computing local statistics and constructing the pixel transform function may be a time consuming task. As discussed above, one way to reduce the computation for real-time image enhancement may be to estimate local statistics only for regions that have large intensity changes, which may mean that major activities occur in those regions. In one embodiment, intensity changes are used to identify active regions, to estimate local statistics, and to construct a pixel transform function only in the active regions in order to reduce computations. FIG. 6 presents a schematic block diagram of the variation measurement module 505 used for detecting regions with large intensity changes.

Specifically, the variation measurement module 505 partitions 605 image frames into regions spatially. Moreover, the variation measurement module 505 constructs 610 temporal data cubes of the regions (e.g., 3D data cubes are formed in the spatial-temporal domain). The variation measurement module 505 computes 615 a temporal intensity change of each region (e.g., estimates temporal intensity changes of the regions). Furthermore, the variation measurement module 505 determines 620 whether the temporal intensity change of a region is greater than a predetermined threshold. The predetermined threshold may be used to select a set of active regions for updating local statistics. For example, if the variation measurement module 505 determines 620 that all of the intensity changes are less than the predetermined threshold, the variation measurement module 505 may generate 625 a region index from a raster scan. The raster scan is used to select a region for local statistics updating. The raster scan is mainly for embodiments in which the temporal intensity change is very slow, such as in a stationary scenario or in a clear environment. If the variation measurement module 505 determines 620 that the intensity changes are greater than the predetermined threshold, the variation measurement module 505 may generate 635 the region index from an intensity scan (e.g., determining a region or regions of the image with intensity changes as explained herein).

To compute intensity changes of a data cube, intensity changes (e.g., frame difference) may be computed along each temporal line of the data cube. The mean values of each temporal line may be used to normalize the temporal intensity changes of the line. The variance of the normalized temporal intensity changes of the data cube may be computed as the measure of intensity change of the data cube. In one embodiment, $cub_k(x, y, t)$ may be a data cube obtained using Equation 15.

$$cub_k(x,y,t) = \{I(x,y,t):(x,y) \in r_k; t_0 \leq t \leq t_1\} \quad \text{Equation 15}$$

In Equation 15, $r_k$ is a partitioned region and $I(x, y, t)$ is an image sequence. A temporal intensity difference may be computed using Equation 16.

$$DIF_k(x, y, t) = \frac{|I(x, y, t) - I(x, y, t+1)|}{\underset{t_0 \leq t \leq t_1}{\text{mean}}(|I(x, y, t) - I(x, y, t+1)|)} \quad \text{Equation 16}$$

The intensity changes of the data cube may be calculated using Equation 17.

$$I_{ch}(k) = \text{Var}[DIF_k(x,y,t)] \quad \text{Equation 17}$$

With the intensity changes of all data cubes, a predetermined threshold $\eta_{ch}$ is used to select active regions with high intensity changes using Equation 18.

$$s(r_k)=1, \text{ if } I_{ch}(k) \geq \eta_{ch}; \text{ otherwise, } 0 \qquad \text{Equation 18}$$

Local image statistics may be computed for selected active regions. The local image statistics may be used to construct new transform functions for each pixel in the active regions and the newly computed transform functions may be used to update a lookup table for the transform functions. After updating the table, every pixel value in the image frame may be modified by the updated transform function table.

Figure 7:
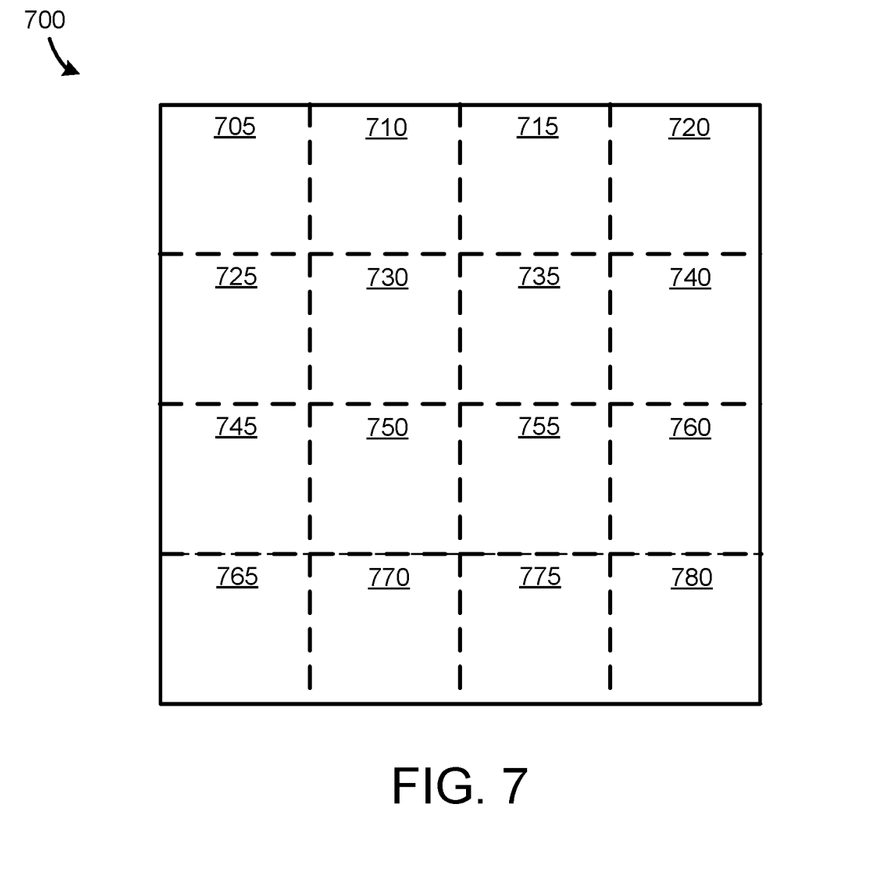
FIG. 7 is a schematic illustration of regions that are used to enhance image data according to one embodiment.

FIG. 7 is an illustration of one embodiment of an image 700 divided into regions 705, 710, 715, 720, 725, 730, 735, 740, 745, 750, 755, 760, 765, 770, 775, and 780. Each of the regions 705, 710, 715, 720, 725, 730, 735, 740, 745, 750, 755, 760, 765, 770, 775, and 780 may be determined and used as set forth herein. Although sixteen regions are illustrated, the image 700 may have fewer or more regions.

Figure 8:
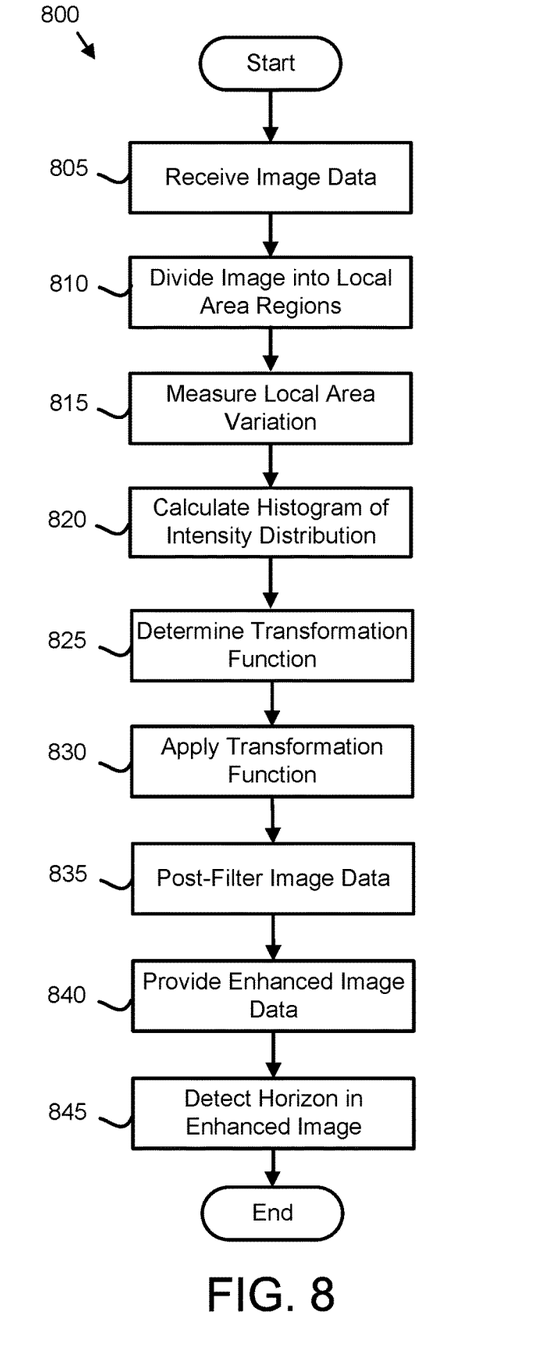
FIG. 8 is a schematic flow diagram of a method of enhancing image data according to one embodiment.

FIG. 8 is a schematic flow diagram of one embodiment of a method 800 for enhancing image data, where the method for enhancing image data may enhance an image of a degraded visibility environment 140 outside a vehicle for display on a display device of a vehicle. The method 800 may include receiving 805 image data (e.g., image data 300), such as receiving 805 image data from a vehicle, apparatus, or system. In certain embodiments, the image data may be infrared data captured by an infrared sensor. In some embodiments, the image data includes multiple images in a video of an environment outside of a vehicle that are acquired in real time using infrared imaging equipment of the vehicle. The method 800 also may include dividing 810 the image data into local area regions as shown in FIG. 7.

Furthermore, the method 800 may include measuring 815 a local area variation in pixel intensity distribution of the image to determine high pixel intensity variations for identifying an intensity-changing region of the local area regions.

Moreover, the method 800 may include calculating 820 a histogram of intensity distribution of local area pixel intensity values for the intensity-changing region.

The method 800 may also include determining 825 a transformation function based on the intensity distribution for the intensity-changing region.

Moreover, the method 800 may include applying 830 the transformation function to modify an intensity for each pixel in the image to produce an enhanced image in real time. Furthermore, the method 800 may include post-filtering 835 the image data. The post-filtering 835 may include applying a smoothing filter to remove artifacts in the enhanced image. The method 800 also may include providing 840 enhanced image data. The method 800 may include detecting 845 a horizon in the enhanced image for providing to an operator of a vehicle an indication of the horizon in the image on a display in the vehicle. The method may also generate an overlay of a horizon indicia on the display device that is operatively coupled to the processor, such as an overlay of a line at the location of the horizon detected in the enhanced image sequence. Accordingly, the method may generate an overlay of a visual indicia of the horizon onto the enhanced image of a degraded visibility environment 140 that is presented on a display device in the vehicle, to provide an easily identified indication of the horizon to the operator of the vehicle In certain embodiments, the method 800 may include calculating a histogram of local intensity distribution for the image, determining an initial transformation function for each pixel in the image based on the local intensity distribution, and creating a lookup table that contains the initial transformation function for each pixel in the image. In such embodiments, the lookup table is used to modify the intensity for each pixel in the image. In some embodiments, the method 800 includes updating the lookup table with the transformation function. In such embodiments, the method 800 may include applying the updated lookup table to modify the intensity for each pixel in the image to produce the enhanced image in real time.

In various embodiments, the method 800 includes calculating an updated histogram of intensity distribution of local area pixel intensity values for the intensity-changing region without calculating a histogram of intensity distribution of local area pixel intensity values for each local area region of the local area regions, determining an updated transformation function based on the intensity distribution for the intensity-changing region, and modifying the intensity for each pixel in the image based on the updated transformation function. In certain embodiments, the intensity-changing region includes more than one local area region.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Embodiments of the image processing module 220 may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

The image processing module 220 may be implemented as a hardware circuit comprising custom VLSI circuits or gate arrays, off-the-shelf semiconductors such as logic chips, transistors, or other discrete components. The image processing module 220 may also be implemented in programmable hardware devices such as field programmable gate arrays, programmable array logic, programmable logic devices or the like.

The image processing module 220 may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized by the image processing module 220. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method of enhancing image data, comprising:
dividing an image into a plurality of local area regions;
measuring a local area variation in pixel intensity distribution of the image to determine high pixel intensity variations among pixels of the image;
identifying a local area region of the plurality of local area regions as an intensity-changing region based on the determined high pixel intensity variations;
calculating a histogram of intensity distribution of local area pixel intensity values for the intensity-changing region without calculating a histogram of intensity distribution of local area pixel intensity values for other local area regions of the plurality of local area regions;

determining a transformation function based on the intensity distribution for the intensity-changing region;
applying the transformation function to modify an intensity for each pixel in the image to produce an enhanced image in real time; and
detecting in the enhanced image a horizon for providing to an operator of a vehicle an indication of the horizon in the image on a display in the vehicle.

2. The method of claim 1, further comprising:
calculating a histogram of local intensity distribution for the image;
determining an initial transformation function for each pixel in the image based on the intensity distribution for the intensity-changing region; and
creating a lookup table that contains the initial transformation function for each pixel in the image, wherein the lookup table is used to modify the intensity for each pixel in the image.

3. The method of claim 2, wherein determining the transformation function based on the intensity distribution for the intensity-changing region further comprises determining a plurality of transformation functions, each transformation function of the plurality of transformation functions corresponding to a respective intensity-changing of a plurality of intensity-changing regions, and the method further comprises:
updating the lookup table with the plurality of transformation functions computed from the plurality of intensity-changing regions; and
wherein applying the transformation function to modify the intensity for each pixel in the image further comprises applying the lookup table, updated with the plurality of transformation functions, to modify the intensity for each pixel in the image to produce the enhanced image in real time.

4. The method of claim 3, further comprising applying a smoothing filter to remove artifacts in the enhanced image.

5. The method of claim 1, further comprising acquiring in real time, from infrared imaging equipment on the vehicle, a plurality of images in a video of an environment outside the vehicle.

6. The method of claim 1, further comprising, for each image of a plurality of images in a video stream:
calculating an updated histogram of intensity distribution of local area pixel intensity values for the intensity-changing region without calculating a histogram of intensity distribution of local area pixel intensity values for each local area region of the plurality of local area regions;
determining an updated transformation function based on the intensity distribution for the intensity-changing region; and
modifying the intensity for each pixel in the image based on an updated lookup table formed based on the updated transformation function.

7. The method of claim 1, wherein the intensity-changing region is identified based on a determination of high intensity variations where intensity changes that are greater than a predetermined threshold are used to identify intensity-changing regions with high intensity variations.

8. A mobile vehicle, comprising:
a sensor configured to detect an image and to produce image data associated with the image;
a processor operatively coupled to the sensor and configured to receive the image data; and
a memory that stores code executable by the processor to:
divide the image into a plurality of local area regions;
measure a variation in pixel intensity in the image;
identify a local area region of the plurality of local area regions with changing intensity based on the variation in pixel intensity in the image;
calculate a histogram of intensity distribution of pixel intensity values for the local area region without calculating a histogram of intensity distribution of pixel intensity values for other local area regions of the plurality of local area regions;
determine a transformation function based on the intensity distribution for the local area region;
apply the transformation function to modify an intensity for each pixel in the image to produce an enhanced image in real time; and
detect in the enhanced image a horizon for providing to an operator of a vehicle an indication of the horizon in the image on a display in the vehicle.

9. The mobile vehicle of claim 8, wherein the sensor comprises an infrared image sensor.

10. The mobile vehicle of claim 8, further comprising a display device operatively coupled to the processor and configured to display the enhanced image.

11. The mobile vehicle of claim 8, wherein the memory stores a lookup table that contains initial transformation functions for each pixel in the image.

12. The mobile vehicle of claim 11, wherein the code is executable by the processor to:
calculate a histogram of local intensity distribution for the image;
determine the initial transformation function for each pixel in the image based on the local intensity distribution; and
create the lookup table that contains the initial transformation function for each pixel in the image, wherein the lookup table is used to modify the intensity for each pixel in the image.

13. The mobile vehicle of claim 8, wherein the code is executable by the processor to apply a smoothing filter to remove artifacts in the enhanced image.

14. The mobile vehicle of claim 8, wherein the sensor is configured to detect a plurality of images in a video of an environment outside the mobile vehicle.

15. The mobile vehicle of claim 8, wherein the region with changing intensity is identified based on a determination of high intensity variations where intensity changes that are greater than a predetermined threshold are used to identify intensity-changing regions with high intensity variations.

16. An apparatus, comprising:
an initialization module that divides an image into a plurality of local area regions, calculates a histogram of local intensity distribution for an image, determines an initial transformation function for each pixel in the image based on the local intensity distribution, and creates a lookup table that contains the initial transformation function for each pixel in the image, wherein the lookup table is used to modify the intensity for each pixel in the image;
a region identification module that measures a local area variation in pixel intensity distribution of the image to determine high pixel intensity variations among pixels of the image, identifies a local area region of the plurality of local area regions as an intensity-changing region based on the determined high pixel intensity variations, calculates a histogram of intensity distribution of local area pixel intensity values for the intensity-changing region without calculating a histogram of intensity distribution of local area pixel intensity values for other local area regions of the plurality of local area regions, and determines a transformation function based on the intensity distribution for the intensity-changing region; and a transformation function update module that applies the transformation function to modify an intensity for each pixel in the image to produce an enhanced image in real time;

wherein at least one of the initialization module, the region identification module, and the transformation function update module comprises one or more of hardware and executable code, the executable code stored on one or more non-transitory computer readable storage media.

17. The apparatus of claim 16, further comprising a filter module that filters the enhanced image to remove artifacts.

18. The apparatus of claim 16, further comprising an update module that updates the lookup table with the transformation function.

19. The apparatus of claim 18, wherein the transformation function update module applies the lookup table, updated by the update module, to modify the intensity for each pixel in the image to produce the enhanced image in real time.

20. The apparatus of claim 16, further comprising an image acquisition module that acquires a plurality of images in a video of an environment outside a vehicle.

* * * * *